United States Patent [19]

Nagano

[11] 4,304,143
[45] Dec. 8, 1981

[54] SPEED CHANGING DEVICE FOR A BICYCLE
[75] Inventor: Masashi Nagano, Sakai, Japan
[73] Assignee: Shimano Industrial Company Limited, Osaka, Japan
[21] Appl. No.: 76,853
[22] Filed: Sep. 19, 1979
[30] Foreign Application Priority Data
Sep. 22, 1978 [JP] Japan .................. 53-116936
[51] Int. Cl.³ .............................. G05G 9/00
[52] U.S. Cl. .............. 74/473 R; 74/501 R; 474/81
[58] Field of Search ............ 74/473 R, 471 R, 475, 74/501 R; 474/81
[56] References Cited
U.S. PATENT DOCUMENTS

| 804,971 | 11/1905 | Packard et al. | 74/471 X |
| 2,544,853 | 3/1951 | Oates | 74/471 |
| 2,961,890 | 11/1960 | Marshall | 74/473 R |
| 3,018,670 | 1/1962 | Lohn | 74/471 |
| 3,808,907 | 5/1974 | Yamaguchi | 74/473 R |

Primary Examiner—Allan D. Herrmann
Attorney, Agent, or Firm—Stevens, Davis, Miller & Mosher

[57] ABSTRACT

A speed changing device for a bicycle comprises a lever unit and a winding unit. The lever unit has a control lever, a first winding body carrying a first control wire connected to a front or rear derailleur, and an engagement for selectively transmitting rotation of the control lever to the first winding body. The winding unit has a second winding body having an engaging portion engageable with the engaging means and carrying a second control wire connected to the other derailleur, and is detachably mounted to the lever unit by means of a coupling.

8 Claims, 7 Drawing Figures

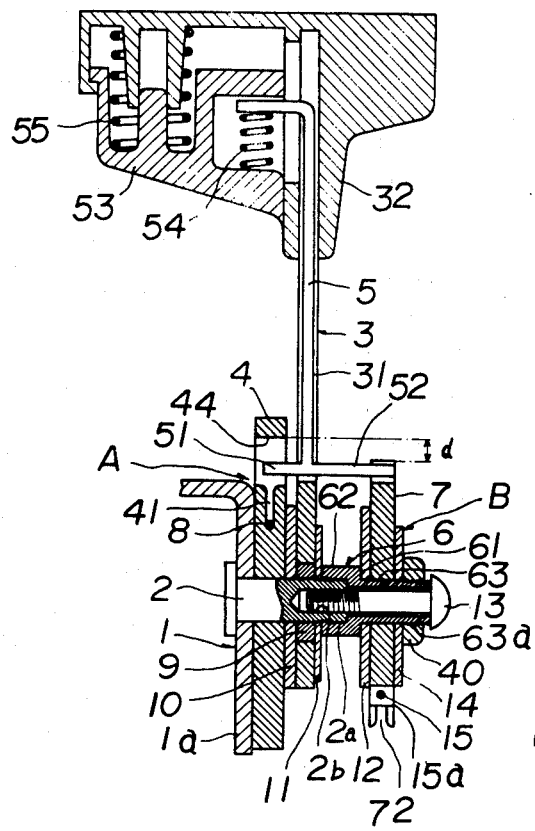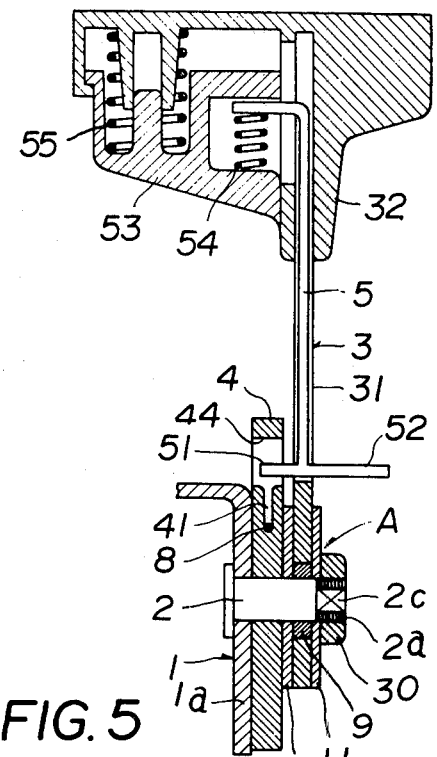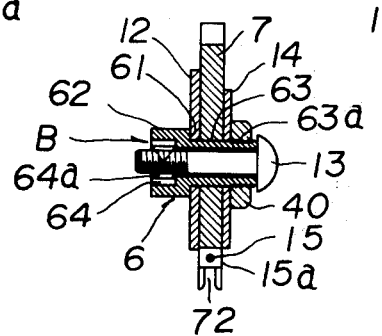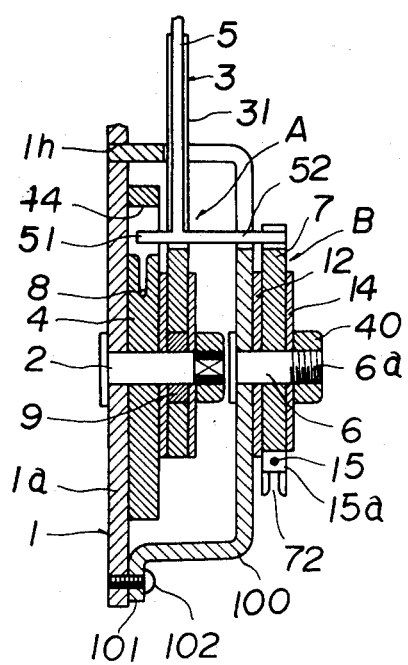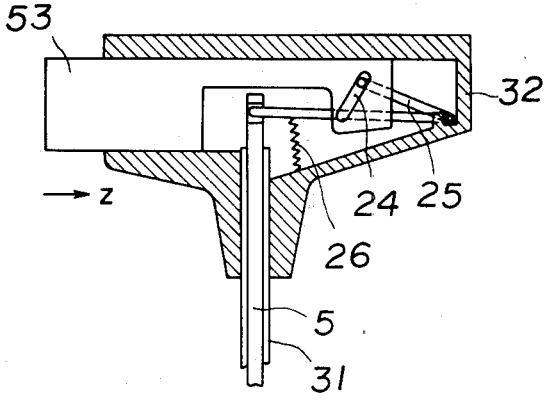

SPEED CHANGING DEVICE FOR A BICYCLE

BACKGROUND OF THE INVENTION

This invention relates to a speed changing device for a bicycle, and more particularly to a speed changing device capable of controlling a front and a rear derailleur by one control lever.

This kind of speed changing device has hitherto been proposed. U.S. Pat. No. 3,808,907 discloses a speed changing device in its specification and drawings, which is so constructed that a drum is rotatably supported to a base member, one control lever is rotatably supported to a shaft extending from the drum perpendicularly with respect to the axis thereof, a control wire for a rear derailleur is attached at one end to the lever, a link mechanism is provided in association with the drum, and a control wire for a front derailleur is attached at one end to the link mechanism, so that the lever is turned with respect to the drum to control the rear derailleur and the lever is turned to rotate the drum to thereby control the front derailleur. This construction is not only complicated but also the lever must be turned in different directions to control the rear and front derailleurs, resulting in a complex operation and the occurrence of malfunctions.

Furthermore, the control mechanisms for the front and rear derailleurs are not separated but are interconnected and used exclusively to control both the front and rear derailleurs. Hence, this prior art device cannot be separated and used for controlling only one derailleur, e.g., the rear derailleur.

In order to overcome the above problem, this invention has been designed. An object of the invention is to provide a speed changing device which is simple in construction and capable of selectively controlling the front or rear derailleur simply and reliably, while being easily separated to form a speed changing device for the front or rear derailleur only, thus being widely usable.

In detail, the speed changing device of the invention is provided with one lever unit comprising a control lever, a first winding body carrying a first control wire connected to one of the front and rear derailleurs, and engaging means for selectively transmitting rotation of the lever to the first winding body, and with a winding unit including a second winding body which has an engaging portion engageable with the engaging means and carries a second control wire connected to the other derailleur, the winding unit being detachably mounted to the lever unit through coupling means.

The lever unit coupled with the winding unit enables one control lever to readily control both the front and rear derailleurs. On the other hand, the lever unit, when the winding unit is removed therefrom, is readily changeable to a speed control device for a front or rear derailleur only. Hence, the speed changing device of the invention is adapted to be configured to meet a user's requirements. Namely, the user, when using the rear derailleur only, need only buy the lever unit, because each of the lever unit and winding unit is individually salable as a bicycle part, thereby saving his expense to the extent the winding unit is not needed. Furthermore, since the lever unit is adapted to control two derailleurs by use of the single control lever, the user, who has equipped his bicycle with the lever unit together with the rear derailleur, can merely couple the winding unit with the lever unit simply and inexpensively when he wants to add the front derailleur.

These and other objects and novel features of the invention will be more apparent from the following description in accordance with the accompanying drawings.

BRIEF DESCRIPTION OF THE DRAWINGS

FIG. 3 is a sectional view taken on Line III—III in FIG. 2, FIG. 4 is a sectional view of a lever unit, FIG. 5 is a sectional view of a winding unit, FIG. 6 is a sectional view of a modified embodiment different in coupling means, in which the principal portion corresponding to FIG. 3 is shown, and FIG. 7 is a sectional view of another modified embodiment different in a control mechanism for engaging means, in which the head of control lever only is shown.

DESCRIPTION OF THE PREFERRED EMBODIMENT

Figure 1:
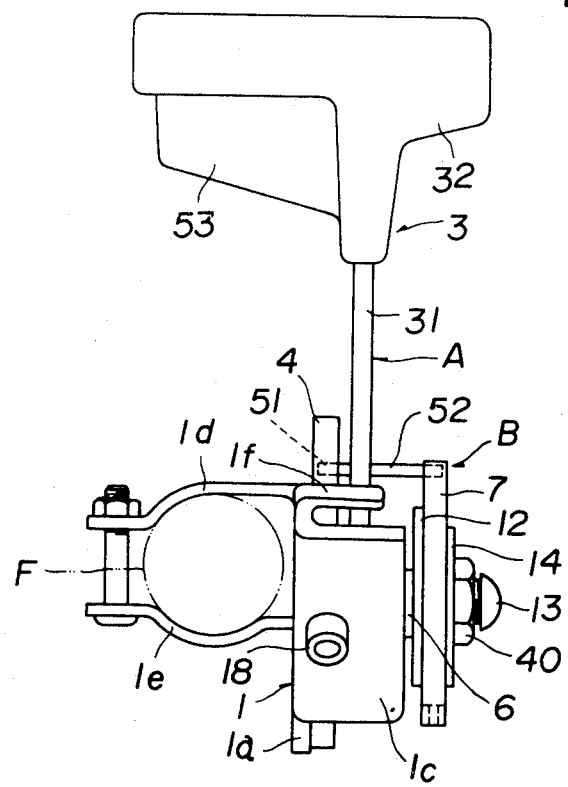
FIG. 1 is a side view of an embodiment of a speed changing device of the invention.

Firstly, a typical embodiment shown in FIGS. 1 through 5 will be detailed in the following description.

Referring to the drawings, reference numeral 1 designates a base member fixed to the bicycle frame, e.g., a top tube F. The base member 1 is made from a metallic plate and comprises a vertical base wall 1a and walls 1b and 1c upright to the wall 1a at both lateral sides thereof. To the vertical wall 1a are attached tightening bands 1d and 1e for fixing the base member 1 to the top tube F. A first pivot 2 projecting horizontally is fixed to a substantially central portion of the vertical wall 1a by fixing means, such as caulking, and is provided at the outer periphery of one end with a screw thread 2a. Reference numeral 3 designates a control lever rotatably supported to the first pivot 2, and 4 designates a first winding body supported to the first pivot 2 at one side lengthwise of the lever 3 in relation of being rotatable independently of the lever 3. Between the lever 3 and the first winding body 4 is provided engaging means for selectively transmitting rotation of the lever 3 to the body 4. Thus, the base member 1, first pivot 2, control lever 3, and first winding body 4, constitute one lever unit A as shown in FIG. 4.

Figure 2:
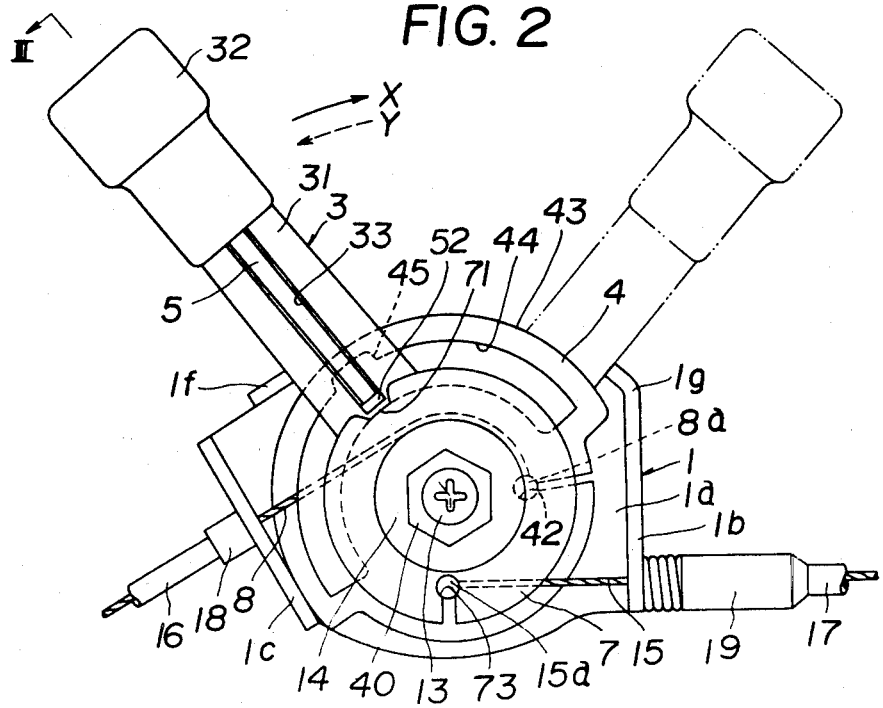
FIG. 2 is a front view thereof.

In greater detail, the control lever 3, as shown in FIGS. 2, 3, comprises a lever body 31 larger in width and a grip 32 fixed to the uppermost end of lever body 31. The lever body 31 has at its widthwise intermediate portion a guide groove 33 extending lengthwise of the same. The engaging means includes a cluth 5 having at its lower end a pair of oppositely extending projections 51 and 52, the clutch 5 bending at the upper portion thereof in an inverted L-like shape. The clutch 5 is supported to the lever body 31 vertically movably through the guide groove 33 thereof. A clutch control 53 is vertically movably supported to the grip 32 at the lever 3. The upper bent end of clutch 5 is elastically supported to the clutch control 53 through a spring 54. In addition, in FIG. 3, reference numeral 55 designates a return spring for biasing the clutch control 53 downwardly.

The first winding body 4 has a guide groove 41 for winding up therethrough a first control wire 8 for controlling the front or rear derailleur, and a bore 42 receiving therein an end piece 8a at one end of the wire 8, so that the control wire 8 is wound through the guide groove 41 and held to the first winding body 4 through the end piece 8a fit into the bore 42.

The winding body 4 has a disc-like shape and includes a larger diameter portion 43. At the larger diameter portion 43 is provided an elongate slot 44 formed in a circular arc and of width larger than the thickness of the projection 51. At the radially outward edge of slot 44 is provided a first engaging portion or recess 45 engageable with the projection 51.

The radially inward edge of the circular arc slot 44 has a diameter slightly smaller than an outer diameter of a second winding body 7 to be hereinafter described. Between the radially outward edge of slot 44 and the outer periphery of the second winding body 7 is formed a gap d of width larger than thickness of the projection 51, so that the projection 51 may move freely within the gap d. Namely, the clutch 5 is moved upwardly in FIG. 2 to put the projection 51 within the gap d to thereby allow the projection 51 to freely move therein. Hence, the lever 3 can be turned regardless of the first and second winding bodies 4 and 7, whereby the gap d serves as a neutral zone for the same.

The lever unit A is constructed of the control lever 3 and first winding body 4 which are combined in relation of being rotatable independently of each other. At an axially intermediate portion of the first pivot 2 is mounted a collar 9 slightly larger in thickness than the lever 3, so that the lever 3 may be supported to the pivot 2 through the collar 9 in relation of being rotatable in a fixed range without being subjected to rotational resistance. The first winding body 4 is positioned between the lever 3 and the vertical wall 1a at the base member 1, and is rotatably supported to the first pivot 2. A washer 10 is inserted between the first winding body 4 and the collar 9 so that the winding body 4 abuts against the lever 3 through the washer 10. A dish-like spring 11 is inserted onto the pivot 2 near the end thereof and a lock nut 30 is tightened to the screw thread 2a, whereby the first winding body 4 is subjected to rotational resistance overcoming a return spring of the derailleur. In other words, the lock nut 30 is tightened to elastically bias the first winding body 4 toward the vertical wall 1a at the base member 1 through the dish-like spring 11, collar 9 and washer 10 to thereby apply frictional resistance to the first winding body 4. Hence, the derailleur, after being controlled by rotation of the first winding body 4, is maintained at a desired speed change stage. In addition, the control lever 3 is restricted in its turning range by stoppers 1f and 1g provided at the base member 1.

Reference numeral 6 designates a second pivot extending in the same direction as the first pivot 2, and 7 designates a second winding body which is disc-like shaped and rotatably supported to the second pivot 6. As seen from FIG. 5, the second pivot 6 and second winding body 7 constitute a winding unit B.

The second pivot 6, as shown in FIGS. 3 and 5, is cylindrical and comprises a larger diameter shaft portion 62 and a smaller diameter shaft portion 63. A stepped portion 61 is provided between the larger diameter shaft portion 62 and the smaller diameter shaft portion 63. The second winding body 7 is rotatably supported onto the smaller diameter portion shaft 63 and a washer 12 is inserted between the second winding body 7 and the stepped portion 61. At the outer periphery of the end portion of smaller diameter shaft portion 63 is provided a screw thread 63a with which a lock nut 40 is screwed. A dish-like spring 14 is inserted between the lock nut 40 and the second winding body 7, and the lock nut 40 is tightened so that the second winding body 7 is subjected to rotational resistance overcoming the return spring at the derailleur.

In other words, the lock nut 40 is tightened to bias the second winding body 7 to the stepped portion 61 through the dish-like spring 14 and washer 12 to thereby apply frictional resistance to the second winding body 7. Hence, the second winding body 7 is rotated to control the derailleur and then maintains it at a desired speed change stage.

The second winding body 7, as shown in FIG. 2, is provided at its outer periphery with a second engaging portion or recess 71 for receiving therein the projection 52 at the clutch 5, and with a guide groove 72 for winding therethrough a second control wire 15 for operating the front or rear derailleur, and with a bore 73 receiving an end piece 15a at the terminal of wire 15. Thus, the second control wire 15 is wound up through the guide groove 72 and held by the second winding body 7 through the end piece 15a fit into the bore 73.

In addition, outer sheaths 16 and 17 guiding the first and second wires 8 and 15 are held at their ends by outer sheath stops 18 and 19 provided at the upright walls 1b and 1c at the base member respectively.

The present invention is directed to coupling means for coupling the lever unit A with the winding unit B as hereinafter described. The coupling means shown in FIGS. 1 through 5 employs a set screw 13 to connect the second pivot 6 with the first pivot 2.

In detail, the first pivot 2 is provided at the center of the fore end face with a threaded bore 2b as shown in FIG. 3, and at the outer periphery of the fore end with a flat face 2c formed by partially cutting the outer periphery so that it is no longer round in section. The larger diameter shaft portion 62 at the second pivot 6 has an inner diameter slightly larger than a major diameter of the screw thread 2a at the first pivot 2. A fitting portion 64 which is also not round in section, having a flat face 64a fit to the flat face 2c at the first pivot 2, has the larger diamter shaft portion 62 sleeved onto the screw thread 2a at the first pivot 2. The set screw 13 is inserted into the second pivot 6 from the axial end of smaller diameter shaft portion 63, and is screwed with threaded bore 2b at the first pivot 2, thereby detachably mounting the second pivot 6 thereto.

In this instance, the lock nut 30 screwed with the thread 2a at the first pivot 2 is removed therefrom; however, the first winding body 4 remains subjected to rotational resistance through the tightened set screw 13.

Next, operation of the speed changing device which is constructed as described above and has the lever unit A coupled with the winding unit B, will be described.

The first control wire 8 wound onto the first winding body 4 may be connected to the front or rear derailleur, but for the purposes of illustration, wire 8 is shown as connected to the latter. The second control wire 15 wound onto the second winding body 7 also may be connected to either derailleur, but the wire 15, when the wire 8 is connected to the rear derailleur, is connected to the front one.

Referring to FIG. 2, the control lever 3 abuts against a stopper 1f as shown by the solid line, and the clutch 5 moves downwardly under the action of return spring 55, so that the projection 52 is engaged with the second engaging portion 71 at the second winding body 7, the second engaging portion 71 being positioned at the stop 1f side.

Under these conditions, assuming that the front derailleur is at the low speed stage and the rear derailleur is at the high speed stage, it will be described how to control the front derailleur from the low speed stage in FIG. 2 to the high speed stage.

In this instance, since the clutch 5 moves downwardly by means a spring 55 and the projection 52 engages with the second engaging portion 71, the lever 3 is turned in the direction of arrow X in FIG. 2 to rotate the second winding body 4 integrally therewith, whereby the second control wire 15 is wound through the guide groove 72 and is pulled to control the front derailleur to the high speed stage. At this time, the projection 51 is not engaged with the first engaging portion 45, whereby the first winding body 4 is stationary to keep the rear derailleur in the high speed stage.

Next, when the rear derailleur is controlled to the low speed stage from the high speed stage in FIG. 2, the clutch control 53 is gripped to move the spring 54 upwardly against the spring 55 to thereby engage the projection 51 with the first engaging portion 45 at the first winding body 4, and thereafter the control lever 3 is turned in the direction of arrow X in FIG. 2. Hence, the first winding body 4 moves together with the lever 3 to pull and wind up the first control wire 8 through the guide groove 41, thereby shifting the rear derailleur to the low speed stage.

Referring to FIG. 2, when the lever 3 is turned and positioned as shown in the dot-and-dash line and the second winding body 7 is positioned as shown in the solid line, the front derailleur is controlled to the high speed stage in such a manner that the clutch 5 is, similarly to the previous situation, moved upwardly to position the projection 51 within the gap d of neutral zone at the slot 44, the lever 3 is turned in the direction of arrow Y to be positioned as shown in the solid line, and then the clutch control 53 is released to engage the projection 52 with the second engaging portion 71, whereby the lever 3 in engagement with the second winding body 7 is turned in the direction of arrow X, thus shifting the front derailleur to the high speed stage.

Hence, the clutch 5 is controllable to engage the projections 51 and 52 selectively with the first and second engaging portions 45 and 71 at the first and second winding bodies 4 and 7 respectively, whereby the winding body 4 or 7 is rotatable together with the lever 3 to separately control the front or rear derailleur.

Within the slot 44, there is the aforesaid neutral zone for the projection 51, so that the control lever 3 may be turned not in association with the winding bodies 4 and 7. Hence, the lever 3, even when restricted in a range of its turn, smoothly controls the derailleur for changing the speed and also always accurately indicates the speed change stage.

When the front and rear derailleurs are not used together but only one, e.g., rear derailleur, is used, the second pivot 6 at the winding unit B is removed from the first pivot 2 at the lever unit A and the screw thread 2a at the pivot 2 is screwed with a lock nut 30 as shown in FIG. 4, so that the lock nut 30 is tightened to apply to the first winding body 4 rotational resistance overcoming the force of the return spring at the rear derailleur, thus providing a speed changing device for the rear derailleur only, where the removed winding unit B is unified by tightening a nut 40 as shown in FIG. 5.

Reversely to the connection of control wires to the derailleurs in the just described embodiment, the first control wire 8 may be connected to the front derailleur and the second control wire 15 to the rear derailleur. In this instance, when the front derailleur only is used, a separate speed changing device therefor is available.

Other than being coupled directly through the set screw 13, the lever unit A may, as shown in FIG. 6, be coupled with the winding unit B in such a manner that; a frame 100 is formed which is seatable onto the vertical wall 1a at the base member 1 of lever unit A; the second pivot 6 is fixed at a substantially central portion thereof by fixing means, such as caulking; onto the second pivot 6 are supported the second winding body 7, washer 12, and dish-like spring 14; and a lock nut 40 is screwed with a screw thread 6a at the second pivot 6 to thereby constitute a winding unit B, so that the frame 100 may be detachably seated to the base member 1 through a flange 101 by use of fixing means 102, such as screws. The frame 100 shown in FIG. 6 is hooked at one end to a bore 1h at the base member 1, and is fixed at the other end by the screws 102.

The clutch 5 at the lever unit A, other than made movable lengthwise of the control lever 3, may be made rotatable around the lengthwise axis of lever 3, or around the axis perpendicular to the longitudinal direction of lever 3. Such a rotatable clutch 5 need not have the two projections 51 and 52 shown in FIGS. 1, 2, 3, 4 and 6. Or, the projections 51 and 52 may be provided independently of the clutch 5, so that the clutch 5 moves, for example, lengthwise of the lever 3 to allow the projections to move in the direction perpendicular to the longitudinal direction of the lever 3, thereby selectively engaging with the first and second engaging portions 45 and 71.

Furthermore, the clutch control 53, other than being constructed as shown in FIG. 3, may be provided with a link mechanism in association with the clutch 5 as shown in FIG. 7, so that the clutch 5 is movable lengthwise of the lever 3. The clutch control 53 is mounted within the grip 32 so as to be slidable perpendicularly to the longitudinal direction of control lever 3. At the clutch control 53 is provided a guide slot 24 slanting leftwardly downwardly in FIG. 7, and within the grip 32 is housed a substantially L-like shaped link 25 which is pivoted at its corner to the grip 32, so that one idle end of the link 25 is engaged with the guide slot 24 and the other idle end with the clutch 5. In such a construction, the clutch control 53 is operated in the direction of arrow Z in FIG. 7 to turn the link 25 counterclockwise around the pivot point, whereby the clutch 5 connected to the other end of link 25 is moved downwardly in FIG. 7. In addition, reference numeral 26 in FIG. 7 designates a return spring.

As clearly understood from the aforesaid description, the speed changing device of the invention is provided with one lever unit A and winding unit B, the winding unit B being detachably mounted to the lever unit A. Hence, when front and rear derailleurs are used, a single lever is able to selectively operate the first winding body 4 for one derailleur through the first control wire 8, and the second winding body 7 for the other derailleur through the second control wire 15. The lever 3 also is turned in the same direction when controlling both the derailleurs, thereby simply controlling the derailleurs without malfunction. Also, the control lever 3, even when restricted in a range most suitable for its turning, allows the front and rear derailleurs to operate reliably and the speed change stage to be accurately indicated.

Furthermore, when the front or rear derailleur is mounted to a bicycle, the winding unit B is detachable from the lever unit A so that the lever unit A alone can be used as a single control speed changing device. As a result, the device is convenient and adaptable to a user's requirement. When only one derailleur is used, the device is as inexpensive as a conventional single-control device, and less expensive than the device disclosed in the Specification and Drawings of U.S. Pat. No. 3,808,907.

The lever unit A can be coupled with the winding unit B with the single control lever controlling the two derailleurs. Hence, if a user, after having bought only the lever unit A for controlling the rear derailleur, wants to add a front derailleur control, he merely needs to add the winding unit B thus lowering costs.

While various exemplary embodiments have been shown and described, the invention is not limited thereto, as numerous modifications can be made without departing from the spirit and scope of the invention, the limits of which are defined solely by the attached claims.

What is claimed is:

1. A speed changing device for a bicycle comprising:
    a lever unit comprising a base member having a first pivot, one control lever rotatably supported to said first pivot, a first winding body positioned at a lateral side with respect to the axis of said lever and supported to said pivot in relation of being rotatable independently of said lever, said winding body including a wire support surface for carrying a first derailleur control wire;
    engaging means for selectively transmitting rotation of said lever to said winding body; and,
    coupling means for detachably mounting a winding unit containing a second winding body adjacent said lever unit such that said one control lever can engage with and operate said second winding body, said second winding body including a wire support surface for carrying a second derailleur control wire, said winding unit further including means for applying resistance against rotation of said second winding body.

2. A speed changing device for a bicycle, comprising one lever unit, one winding unit mounted selectively to said lever unit, and coupling means for mounting said winding unit detachably to said lever unit, said lever unit comprising:
    a base member having a first pivot, one control lever rotatably supported to said first pivot at said base member, a first winding body positioned at a lateral side with respect to the axis of said lever and supported to said pivot in relation of being rotatable independently of said lever, said first winding body including a wire support surface for carrying a first derailleur control wire, and engaging means for selectively transmitting rotation of said lever to said first winding body; said winding unit comprising:
    one second pivot extending in the same direction as said first pivot and having a first engaging element, one second winding body which is rotatably supported to said second pivot, and resistance means for imparting a resistance to the movement of said second winding body, said second winding body having an engaging portion engageable with said engaging means, a wire support surface for carrying a second derailleur control wire, and a second engaging element for engaging with the first engaging element of said second pivot to mount said second winding body on said second pivot.

3. A speed changing device for a bicycle according to claim 2, wherein said engaging means for transmitting rotation of said control lever selectively to said first winding body comprises a clutch having a pair of projections, said clutch being supported movably to said lever, said first and second winding bodies having a first and a second engaging portion engageable with said clutch respectively.

4. A speed changing device for a bicycle according to claim 2, wherein one of said first and second winding bodies has a round outer periphery and the other is provided with a portion larger in diameter than said outer periphery, said larger diameter portion having an elongate slot formed in a circular arc, and said first engaging portion is provided at one of said round outer periphery and inner surface at the larger diameter side of said slot, and said second engaging portion is provided at the other.

5. A speed changing device for a bicycle according to claim 2, wherein said clutch is supported to said lever in relation of being vertically movable lengthwise of said lever, and has at the upper end a clutch control and at the lower end two projections engageable with said first and second engaging portions at said first and second winding bodies respectively, said lever having at its top a grip, said clutch control being movably supported to said grip.

6. A speed changing device for a bicycle according to claim 2, wherein said first pivot at said lever unit has at the axial end thereof a screw thread, and said second pivot at said winding unit has a screw thread screwable with the axial end of said first pivot, said second pivot being screwed with said first pivot to thereby mount said winding unit detachably to said lever unit.

7. A speed changing device for a bicycle according to claim 5, wherein said second pivot at said winding unit has hollow shaft portions of a smaller outer diameter and a larger outer diameter, said smaller diameter shaft portion carrying therewith said second winding body, said larger diameter shaft portion having a not round bore fit to the axial end of said first pivot at said lever unit, said first pivot being not round at the outer periphery at the axial end portion, and provided at the radial center of said axial end portion with a threaded bore, so that a set screw inserted from the axial end of said second pivot is screwed with said threaded bore at said first pivot to thereby mount said winding unit detachably to said first pivot.

8. A speed changing device for a bicycle according to claim 2, wherein said winding unit has a frame which is seated onto the base member at said lever unit, said frame fixedly supporting said second pivot onto which said second winding body is rotatably supported, the seating portion of said frame being detachably mounted to said base member through said coupling means.

* * * * *